United States Patent
Hastings et al.

(10) Patent No.: US 6,834,062 B2
(45) Date of Patent: Dec. 21, 2004

(54) METHOD AND APPARATUS FOR CONTROLLING LASER ENERGY

(75) Inventors: Stephen Hastings, Munich (DE); Peter Dullin, Krailling (DE); Alistair Gill, Krailling (DE); Erwin Wagner, Krailling (DE); Peter von Jan, Krailling (DE); Wolfgang Hauck, Krailling (DE)

(73) Assignee: Raylase AG, Wessling (DE)

( * ) Notice: Subject to any disclaimer, the term of this patent is extended or adjusted under 35 U.S.C. 154(b) by 74 days.

(21) Appl. No.: 10/199,034

(22) Filed: Jul. 22, 2002

(65) Prior Publication Data

US 2003/0086451 A1 May 8, 2003

(30) Foreign Application Priority Data

Nov. 6, 2001 (DE) .......................................... 101 54 363

(51) Int. Cl.[7] ................................................ H01S 3/10
(52) U.S. Cl. ............................... 372/9; 372/21; 372/107
(58) Field of Search ....................... 372/29.014, 29.01, 372/9, 103, 108, 29.016, 21, 22, 15, 20, 104–107; 33/285, 290, 286

(56) References Cited

U.S. PATENT DOCUMENTS

| | | | | |
|---|---|---|---|---|
| 4,118,109 A | * | 10/1978 | Crawford et al. | ........... 359/196 |
| 4,330,213 A | * | 5/1982 | Kleinknecht et al. | ....... 356/496 |
| 4,398,806 A | * | 8/1983 | Bennett et al. | ............. 359/487 |
| 4,426,140 A | * | 1/1984 | Stephens | ..................... 351/204 |
| 4,747,673 A | * | 5/1988 | Marrs et al. | ................. 359/583 |
| 5,646,764 A | * | 7/1997 | Moore et al. | ................ 359/201 |
| 6,044,094 A | * | 3/2000 | Govorkov | ...................... 372/21 |
| 6,130,731 A | * | 10/2000 | Andersson et al. | ........... 349/77 |
| 6,362,454 B1 | * | 3/2002 | Liu | .......................... 219/121.7 |
| 6,429,982 B2 | * | 8/2002 | Bolt | ........................... 359/831 |
| 6,493,364 B1 | * | 12/2002 | Baumler et al. | .............. 372/15 |

* cited by examiner

*Primary Examiner*—Minsun Oh Harvey
*Assistant Examiner*—Tuan N. Nguyen
(74) *Attorney, Agent, or Firm*—Duane Morris LLP (57) ABSTRACT

The present invention provides a method and apparatus for controlling laser power, using at least two Brewster windows which are aligned along an axis which is parallel to the direction of the laser beam and which are rotatable around said axis, wherein the first Brewster window is rotated in one direction and the second Brewster window is rotated in the opposite direction. Preferably, both Brewster windows only have to rotate each through +/−45° to control transmission of the laser beam from maximum to minimum.

12 Claims, 8 Drawing Sheets

Six unenhanced Brewster window arrangement at 0° alignment.

Fig. i – Six unenhanced Brewster window arrangement at 0° alignment.

Figure 10

Fig. ii – Six unenhanced Brewster window arrangement rotated.

METHOD AND APPARATUS FOR CONTROLLING LASER ENERGY

RELATED PATENT DOCUMENTS

The invention relates to an apparatus and a method for controlling laser energy. The present invention uses the method and apparatus described in the international application PCT/EP 00/08703.

BACKGROUND OF THE INVENTION

PCT/EP 00/08703 describes a method and apparatus for controlling the level of laser beam energy of a laser beam scanning across a target using at least one laser scanhead, said laser scanhead comprising motor driven deflection means for scanning the laser beam across the target and polarization control means, wherein the polarization control means controls the level of laser beam energy of the laser beam scanning across the target in accordance with the movement of the deflection. In particular, the polarization control means includes one or two Brewster plates or Brewster windows which are rotatable around an axis which is parallel to the direction of the laser beam. The one or two Brewster plates can be rotated at an angle between 0° and 90° to control laser beam transmission between 0% and 100%. Because a laser beam in general includes only one type of polarization, a Brewster plate, set at the correct Brewster angle, can be used to transmit between 0% and 100% of said polarization. The rotation of the Brewster plate is synchronized to the rotation of the deflection means, deflecting the laser beam for targeting a scanned surface.

Reference is made to PCT/EP 00/08703 in its entirety.

Figure 1:
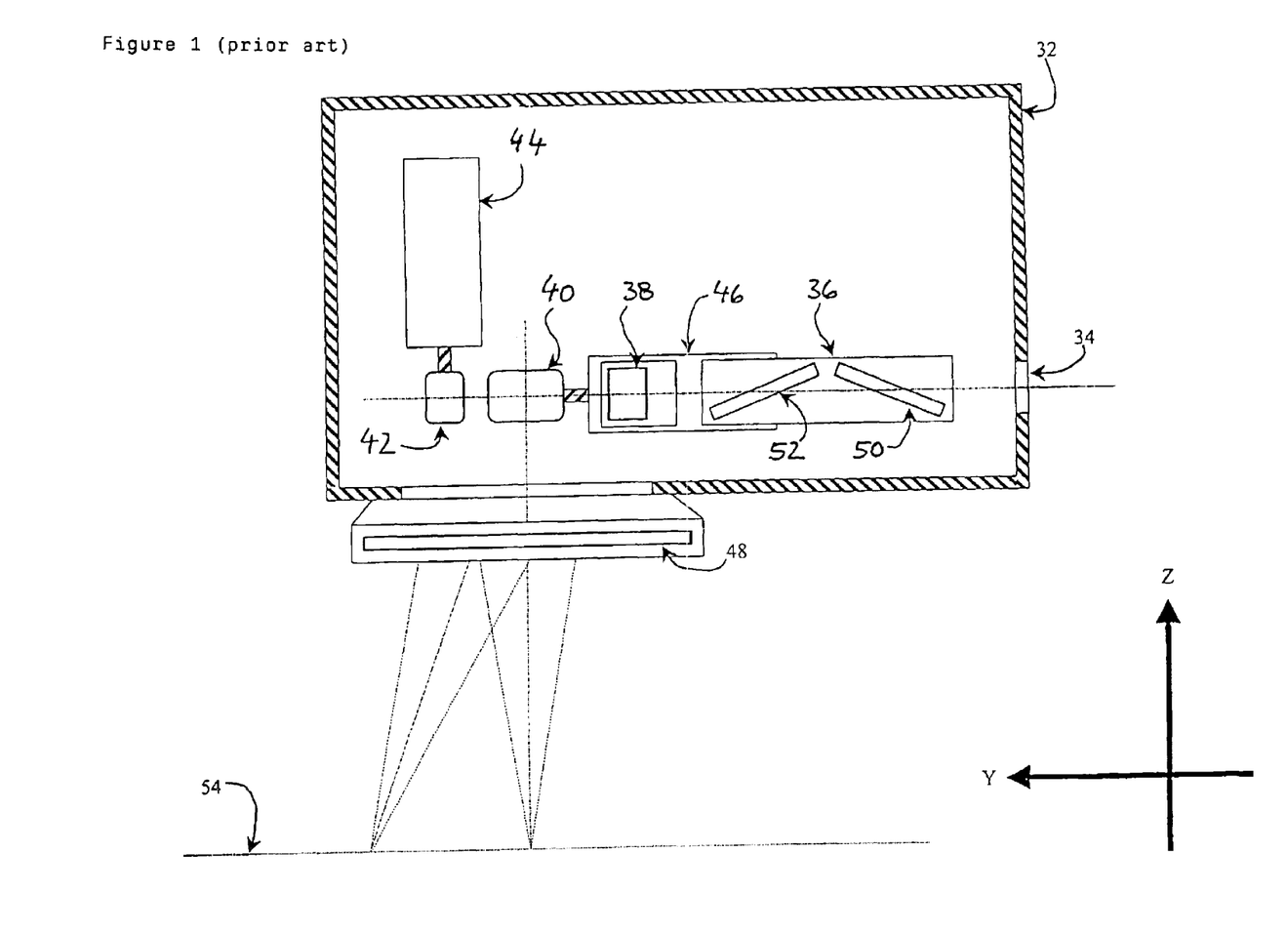
FIG. 1 shows a schematic drawing of a laser beam targeting apparatus according to the prior art.

FIG. 1 shows a diagram of the laser beam targeting apparatus according to PCT/EP 00/08703. The laser beam targeting apparatus is integrated into a scanning head 32 of a laser scanner into which a linearly polarized laser beam is passed through an aperture 34. The scanning head 32 comprises a polarization control device 36 which can be either integral or mounted in the beam axis line preceding the scanning head, a beam expansion optic 38, a Y axis mirror 40, a X axis mirror 42, two galvanometric motors 44 and 46 for rotating the two mirrors 40 and 42, respectively, and an f-theta focusing lens 48. The polarization control device 36 of the embodiment of FIG. 1 comprises a first Brewster plate 50 and a second Brewster plate 52. In an alternative embodiment, this technique could also be used with either pre- or post-objective scanning.

In a further alternative embodiment, a polarization control device comprising a single Brewster plate could be used to achieve basically the same effect, as described above.

In the shown embodiment a carbon dioxide ($CO_2$) laser is used for creating a laser beam linearly polarized in a single direction. However, the expert will understand that any other suitable type of laser source may be used. The laser beam enters the scanning head 32 through the aperture 34 and is passed through the polarization control device 36 in which two opposing ZnSe-Brewster plates 50, 52 are set at the relevant Brewster angles with regard to the laser beam wavelength. The Brewster plates 50, 52 can be rotated through 90° to attenuate the laser beam thereby, allowing 0% to 100% of the laser beam energy to be transmitted through said Brewster plates 50, 52 when they are rotated around the laser beam axis from 0° to 90°. For other types of lasers other material might be required for the Brewster plates. Alternative coatings may be used on the face of the Brewster plates which may vary the maximum and minimum levels of transmitivity, the exit polarization, and the required rotation of the Brewster plates. In practice, the maximum transmitivity of a Brewster window of the type described above is "only" 99.98%. However, for the purpose of the present description a transmitivity of 100% may be assumed. Therefore, if in the present text a transmitivity of 100% is indicated, it is referred to the maximum transmitivity of the respective Brewster window, which in the embodiment considered is 99.98%.

The part of the laser beam energy transmitted through the Brewster plates 52, 50 in this embodiment passes through a beam expansion optic 38 which expands the laser beam diameter and is then deflected off the surface of the Y axis galvanometric motor driven mirror 40 to be then deflected off the surface of the X axis galvanometric motor driven mirror 42 and through the f-theta focusing lens 48 which acts to focus the laser beam to a fine point on a target plane 54. The intensity of the laser beam energy scanned across the target plane 54 is held under strict control by controlling the rotation of the Brewster plates 52, 50 as a function of the rotation, position, angular speed of the galvanometric motor driven mirrors 40, 42.

It is important that the travelling time to and from maximum required velocity of the combined XY beam position at the target is matched to the transmission curve of the opening and/or closing of the Brewster rotation. In practice, every travelling time of the beam crossing the target plane in the X or Y direction, and importantly the combined XY directions should be defined. It is assumed that this defined travelling time will be determined by the capability in speed of the polarization control device 36 to open and close the Brewster plates. Therefore, if as an example it takes 1 ms for the Brewster plates to open, within an acceptable tolerance, from 0% to 100% and, equally 1 ms to close, then the scanning head 32 and in particular the combined scanning mirrors 40, 42 should reach the maximum speed in 1 ms. Because coated or enhanced Brewster plates have a transmitivity of 0% when set to the appropriate angle it is not necessary to turn off the laser beam between independent processing or marking steps of the target material.

The PCT application describes the actions of the Brewster windows set at a specific Brewster angle to control laser power by reflecting or transmitting a single directionally polarised carbon dioxide generated laser beam energy. The same method can be applied to any single directionally polarised energy using the correct material for the Brewster windows and the correct Brewster angle specific to the wavelength of said energy.

Figure 2:
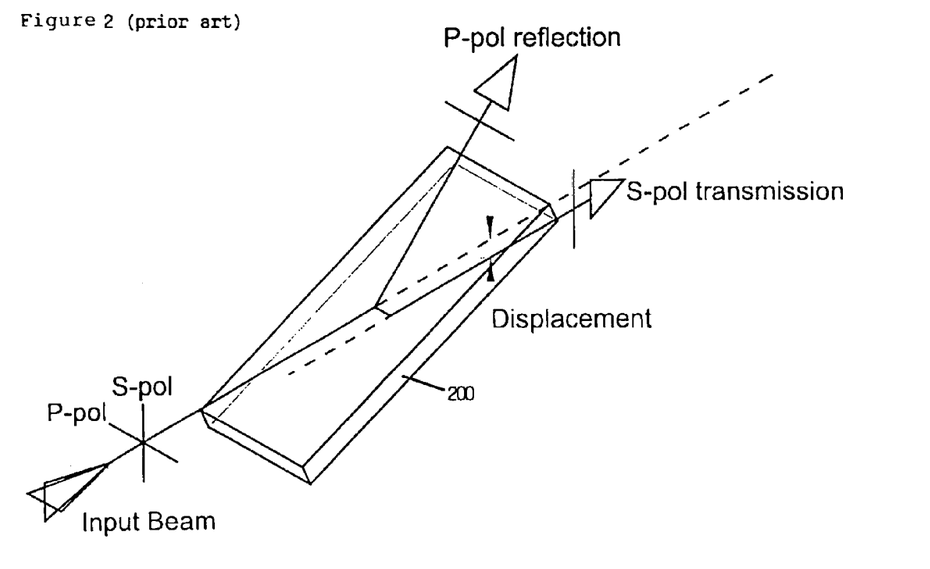
FIG. 2 shows an example of a Brewster window for explaining the behaviour of a polarised laser beam which is reflected or transmitted by the Brewster window.

FIG. 2 details how a laser beam polarised in either the P-pol (parallel) or S-pol (senkrecht or perpendicular) directions can be reflected or transmitted using a single Brewster window 200.

For illustration purpose both P-polarization and S-polarization are shown in the drawings. However, an expert will understand that in practice a $CO_2$ laser beam can comprise basically only one type of polarization. With reference to FIG. 2 if said input polarization is P-pol then the energy will be reflected whilst if said input polarization is S-pol then the energy will be transmitted.

Disadvantageously, said transmitted beam energy will be displaced by a factor calculated by the Brewster angle giving an angle of incidence and by the thickness of the Brewster window itself.

Figure 3:
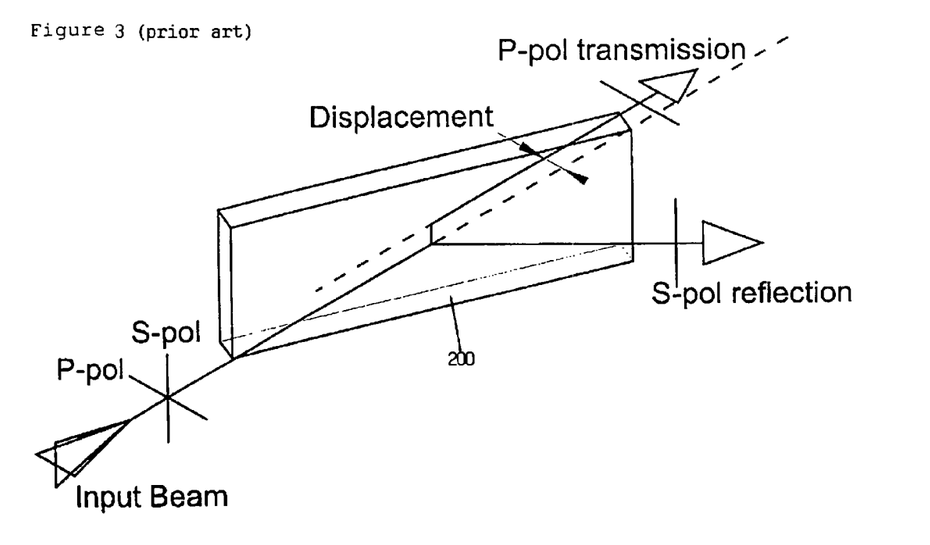
FIG. 3 shows the Brewster window of FIG. 2 when rotated through 90°.

FIG. 3 depicts the Brewster window 200 rotated through 90° where now the P-pol is transmitted and the S-pol is reflected. The beam energy is displaced exactly the same as in FIG. 2 except that it has now been rotated 90° about the centerline.

Figure 4:
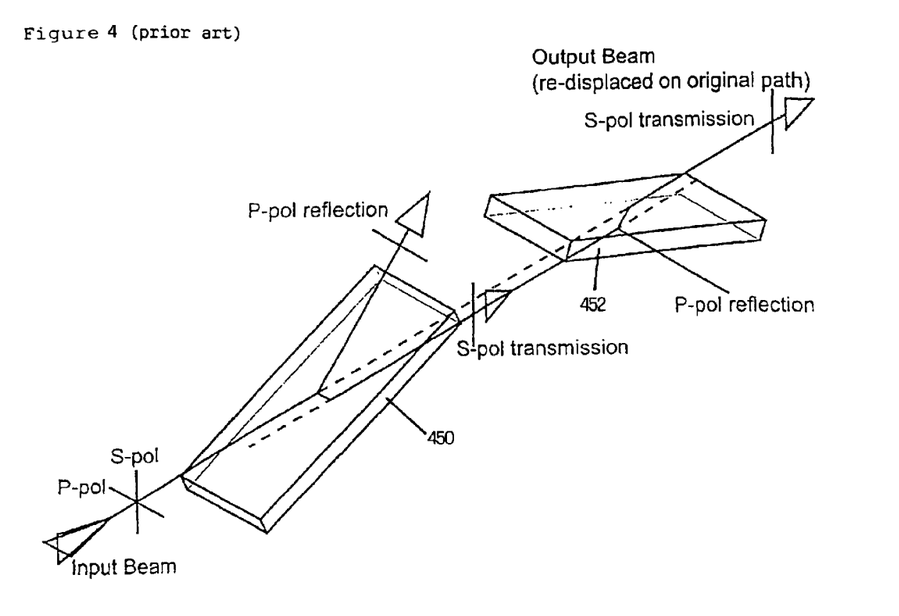
FIG. 4 shows an arrangement of two Brewster windows or Brewster plates which can be used in the apparatus of FIG. 1.

FIG. 4 shows how two Brewster windows 450, 452 aligned together allow for the output beam energy path to be the same as the input beam energy path by the actions of the second Brewster window 452 compensating for the displacement created by the first Brewster window 450. In reality and depending upon the coating on the Brewster windows 450, 452 the P-pol reflected off the first Brewster window 450 will be of a very high percentage leaving only a very small percentage to be reflected off the second Brewster window 452.

Figure 5:
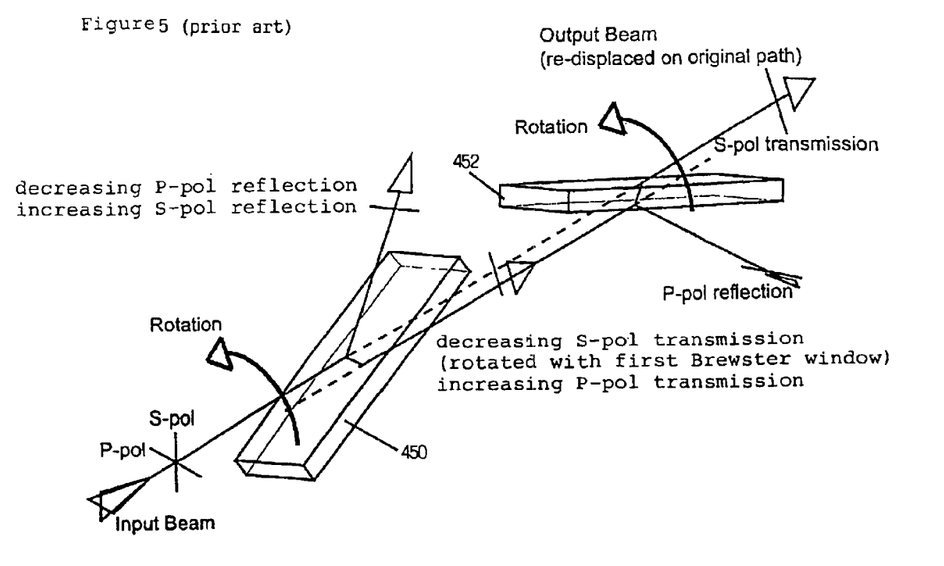
FIG. 5 shows the arrangement of the two Brewster windows of FIG. 4 wherein the Brewster windows are rotated in unison in the same direction.

FIG. 5 depicts the two Brewster windows 450, 452 rotated in unison in the same direction. As the rotation increases the P-pol reflected off the first Brewster window 450 decreases and the P-pol transmission increases. Correspondingly as the rotation increases the S-pol transmission through the first Brewster window 450 decreases and the S-pol reflection increases.

It is important to note that the laser beam energy polarization exiting the first Brewster window 450 is rotated with the rotation of said first Brewster window 450 dependant upon its coating. Therefore any P-pol that has been transmitted through the first Brewster window 450 will be reflected off the second Brewster window 452 and correspondingly any S-pol that has been transmitted through the first Brewster window 450 will be transmitted through the second Brewster window 452.

Therefore, the second Brewster window 452 will have no significant additional secondary effect on energy control except to re-displace the beam energy back onto the same path as the input beam.

Using the method as depicted in FIG. 5 the two Brewster windows 450, 452 must be rotated in unison through 90° in order to control transmission from maximum to minimum and to compensate the offset of the laser beam.

Reference U.S. Pat. No. 4,632,512 describes a method for sequentially attenuating, modulating, and polarizing wherein the laser beam source emits a laser beam which is polarized in one direction. The part of the apparatus used for polarization comprises a fixed pair of symmetrically arranged Brewster elements wherein the axis of symmetry of the polarization part of the arrangement is perpendicular to the axis of the laser beam, and the Brewster elements are declined towards the axis of the laser beam at an angle which corresponds to the Brewster angle.

SUMMARY OF THE INVENTION

It is an object of the present invention to further improve the method and apparatus for controlling a laser beam.

To solve this problem the present invention provides a method and apparatus for controlling laser power, using at least two Brewster windows which are aligned along an axis which is parallel to the direction of the laser beam and which are rotatable around said axis, wherein the first Brewster window is rotated in one direction and the second Brewster window is rotated in the opposite direction. In one preferred embodiment of the invention two coated Brewster windows are used, each of which have a transmitivity of almost 100% (in practice 99.98%) to 0% when rotated through 90°. According to the invention, these two Brewster windows only have to rotate each through +/−45° to control transmission of the laser beam from maximum to minimum.

According to another embodiment of the invention, uncoated Brewster windows are used which have a transmitivity of about 100% to 25% when rotated through 90°. The advantage of uncoated Brewster windows is that they are able to transmit high power laser beams, in the range of about 6 kW, whereas the coated Brewster windows would be damaged by such high power and therefore are limited to transmit laser beams having a lower power. When using uncoated Brewster windows, preferably a plurality of pairs of Brewster windows, such as two or three pairs, are aligned along the laser beam axis. The Brewser windows of each pair are rotated in opposite directions through an angle between 45° and 90°, as will be explained in further detail below. Thus, a method and apparatus for controlling high power laser beams is provided which is reduced in costs and complexity.

In other words, the invention relates to a method and an apparatus to finely control or regulate laser energy reaching a target in direct relationship to the velocity of the focussed beam or spot at that target.

The present invention also provides an apparatus for controlling a level of laser beam energy of a laser beam, comprising at least two Brewster windows which are aligned along an axis which is parallel to the direction of the laser beam, and driving means for rotating said Brewster windows around said axis, wherein said driving means are adapted to rotate a first Brewster window in a first direction and a second Brewster window in a second, opposite direction.

SHORT DESCRIPTION OF THE DRAWINGS

The invention shall be described in further detail with reference to two preferred embodiments, illustrated in the drawings.

DETAILED DESCRIPTION OF PREFERRED EMBODIMENTS

Figures 6, 8:
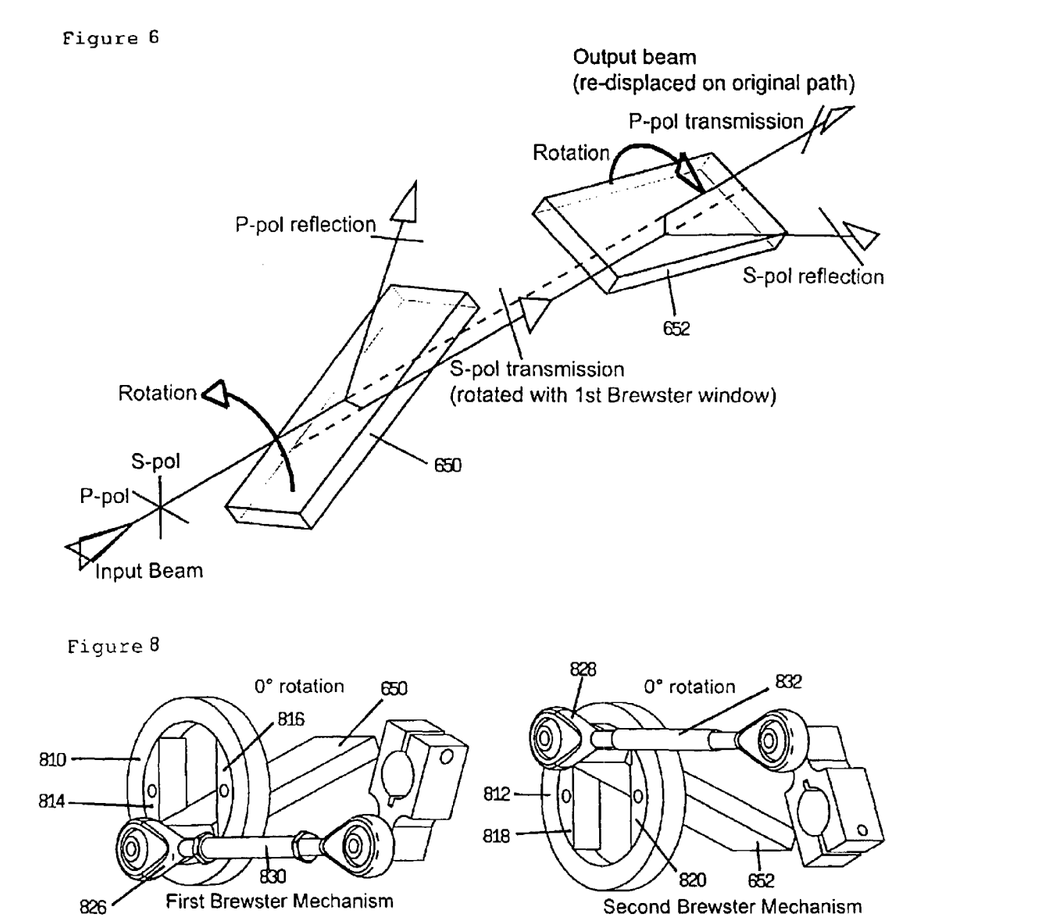
FIG. 6 shows an arrangement of two Brewster windows according to the invention being rotated in opposite directions to obtain the transmission curves of FIG. 7.
FIGS. 8 and 9 show an arrangement for mechanically driving the two Brewster windows of FIG. 6, synchronised in opposite directions, wherein in FIG. 8 the Brewster windows are at 0° alignment and in FIG. 9 the Brewster windows are rotated through +/−45°.

FIG. 6 shows an arrangement of two Brewster windows 650, 652 according to a first embodiment of the present invention, rotated in opposite directions, each through 45° to control the transmission from maximum to minimum. The Brewster windows 650, 652 of the first embodiment of the invention preferably are coated to obtain a transmitivity range of almost 100% to 0% when rotated through 90°. FIG. 6 shows an input beam, wherein for illustration purposes both P-polarization and S-Polarization are depicted. An expert will understand that, in practice, a laser beam will comprise only one type of polarization, more specifically approximately 99% of one type of polarization and the remainder of the opposite polarization. One example of a suitable laser to be used in the present invention is a $CO_2$ laser, although the invention is not limited in this regard.

In the following, the present invention will be described with reference to FIGS. 4 and 6. FIG. 4 shows the two Brewster windows 450, 452 in their initial position when they have not been rotated. FIG. 6 shows the two Brewster windows 650, 652 according to the present invention in their end positions when they have been rotated through +/−45°. The present invention shall be described with reference to a laser beam having S-polarization.

In FIG. 4, the laser beam having S-polarization is directed to the first Brewster window 450 which transmits 100% S-polarization—and reflects the remainder, about 1%, of P-polarization. This 1% of unwanted P-Polarization may be "cleaned" off by use of coated or uncoated static Brewster windows mounted before the apparatus as described in the present invention and in the international application PCT/EP 00/08703. Further, the first Brewster window 450 displaces the S-polarised laser beam by an offset, as shown in FIG. 4. The second Brewster window 452, in its initial position, also transmits 100% of S-polarization and reflects the remainder of P-polarization if any. Additionally, the second Brewster window 452 re-displaces the laser beam on the original vertical path, whilst the horizontal displacement remains parallel to the incoming beam.

With reference to FIG. 6, the first Brewster window 650 is rotated around the axis of the laser beam through 45° in a first direction. Accordingly, the transmission curve for S-polarization goes from 100% to 50% transmission; i.e. the S-polarised beam is transmitted from 100% to 50% while the first Brewster window is rotated, the rest of the S-polarised beam is reflected. Additionally, the remaining S-polarised beam exiting the first Brewster window is rotated together with the first Brewster window 650 by 45°.

At the same time, the second Brewster window 652 is rotated through 45° around the axis of the laser beam in the opposite direction.

Accordingly, after rotation of both Brewster windows 650, 652 in opposite directions, through 45°, 50% of the S-polarised beam, rotated by 45°, is transmitted by the first Brewster window 650 to the second Brewster window 652. Because the second Brewster window 652 has been rotated through −45°, the net relative angle between the second Brewster window 652 and the rotated S-polarised beam is 90°. Accordingly, when rotating the first Brewster window 650 in the first direction and the second Brewster window 652 in the opposite direction, the relative angle between the S-polarised beam and the second Brewster window 652 goes from 0° to 90° and, accordingly, the transmission curve of the second Brewster window 652 goes from 100% to 0% of the S-polarised beam. As a result, the output of the second Brewster window 652 is a controlled level of the S-polarised beam between 100% and 0% wherein the remainder of the S-polarised beam is reflected. Additionally, the second Brewster window 652 re-displaces the laser beam on its original vertical path.

To summarise, according to the first embodiment of the present invention, when the first Brewster window 650 is rotated in one direction and the second Brewster window 652 is rotated in the opposite direction, both Brewster windows only have to rotate each through 45° to control transmission from maximum to minimum.

Figure 7:
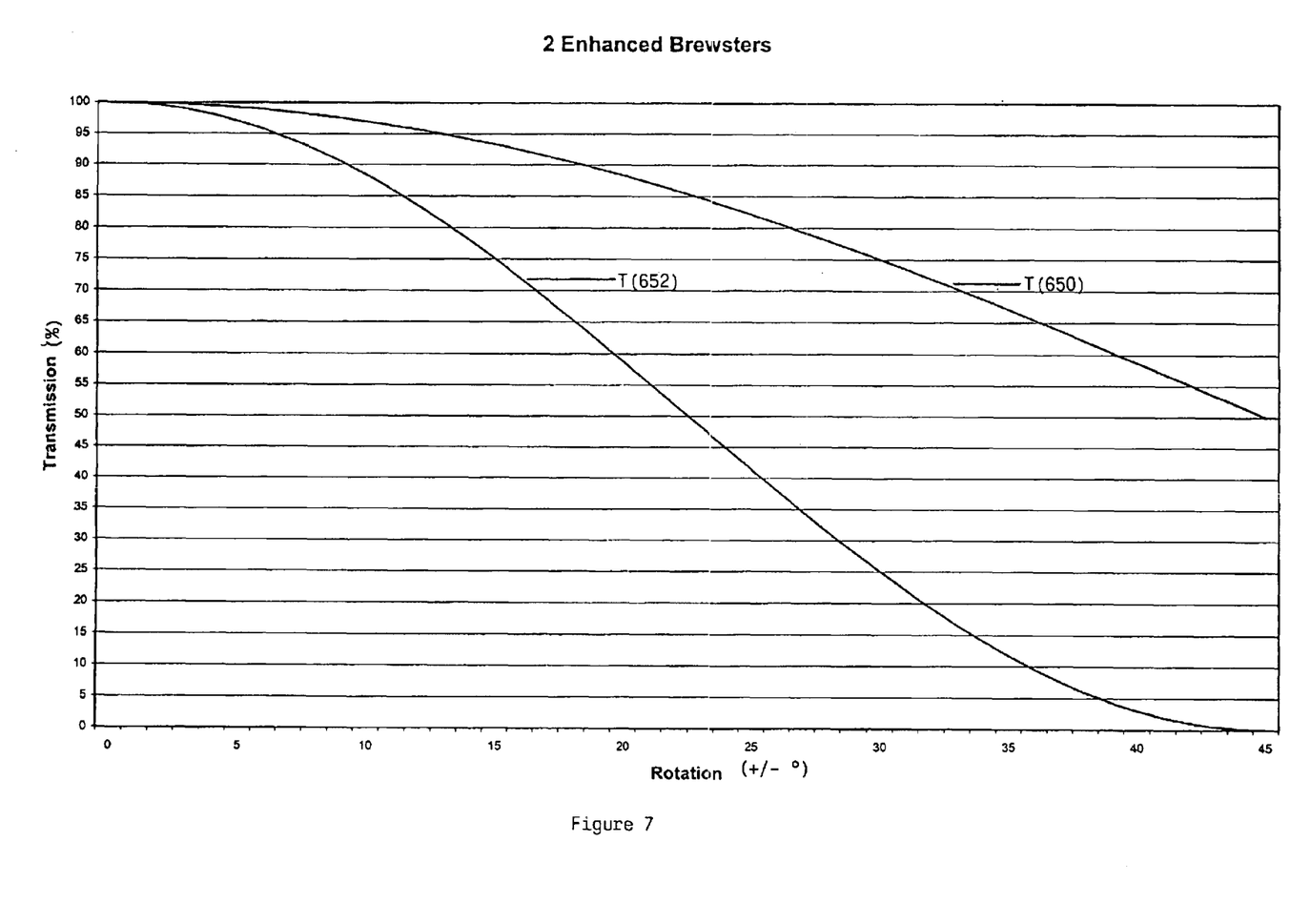
FIG. 7 shows a diagram of the transmission curves of a laser beam when using a set of two coated Brewster windows as shown in FIG. 6.

This is better illustrated with regard to the transmission curves of the laser beam which is transmitted by the first and second Brewster windows 650, 652. The transmission curve of the first Brewster window 650 is designated T(650) and the combined transmission curve of the first and second Brewster windows 650, 652 is designated T(652). Again, it is assumed that coated Brewster windows are used which have a transmission curve from 0% to 100% when rotated through 90°. The transmission curve of the first Brewster window T(650) shows that the transmission goes from 100% to 50% when the Brewster window is rotated from 0° to 45°. At the same time, the second Brewster window 652 is rotated in the opposite direction to produce transmission curve T(652) which goes from 100% to 0% at 45°. Measurements have shown that the transmission characteristic of the pair of Brewster windows 650, 652 corresponds to the predicted behaviour explained above.

Figure 9:
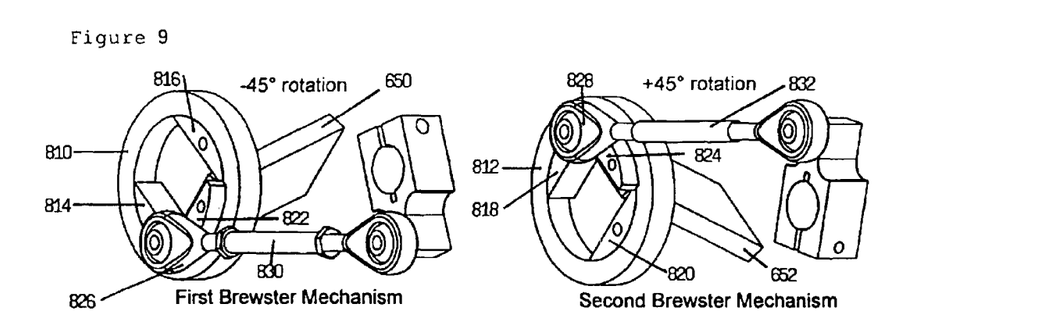

FIGS. 8 and 9 show an arrangement of mechanically driving the two Brewster windows 650, 652, synchronised in opposite directions, wherein each Brewster window 650, 652 is held within a roller bearing 810, 812 and mounted using only two side plates 814, 816, 818, 820 and a base plate 822, 824 to which is attached a direct linkage 826, 828 to a lever 830, 832 rotated on the spindle of a motor (not shown). According to the present invention, the Brewster windows 650, 652 may be rotated using one or two motors, e.g. galvanometric motors, spindle motors or any other type of suitable motor.

Figure 10:
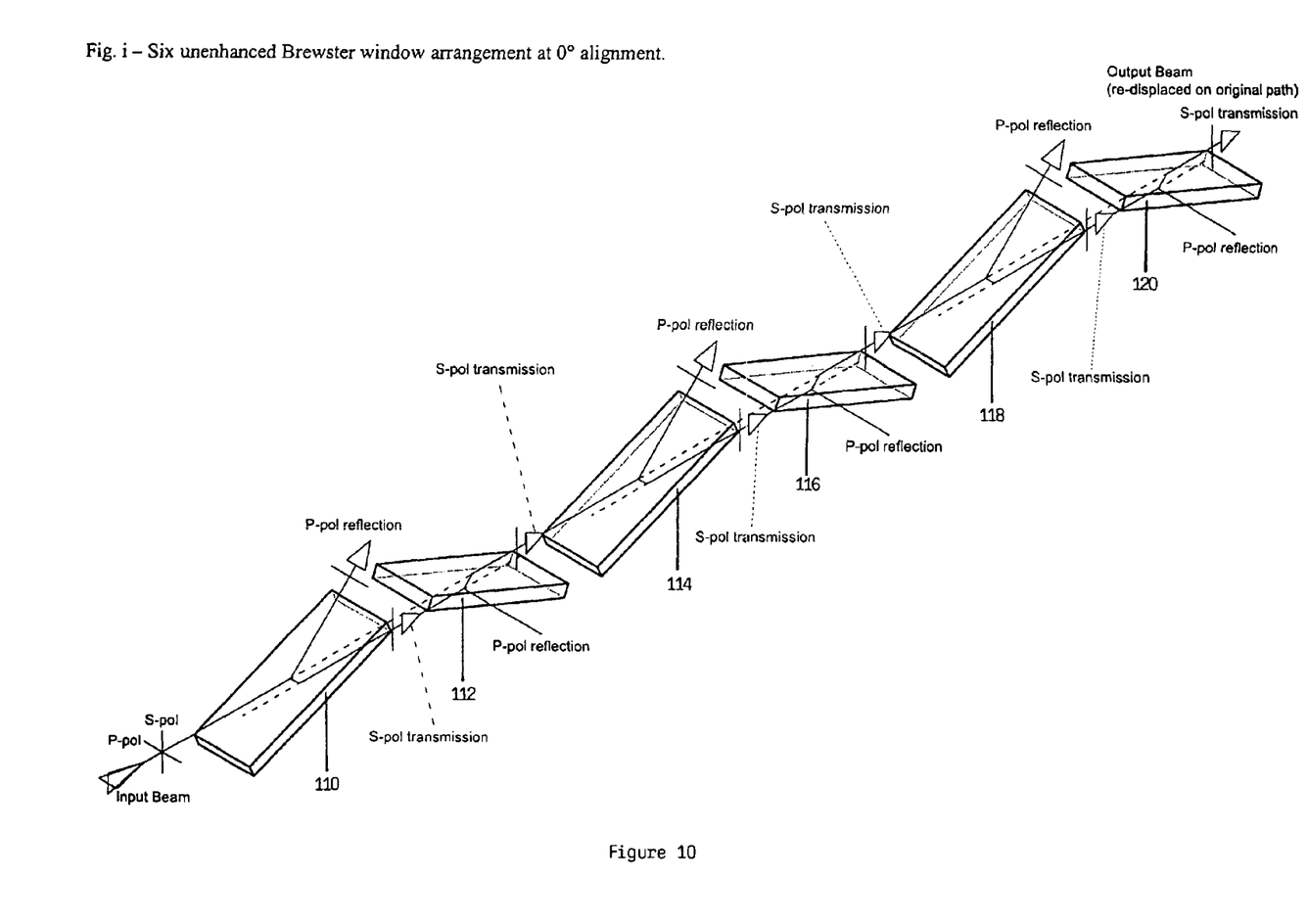
FIG. 10 shows an arrangement of six Brewster windows, at 0° alignment, according to a second embodiment of the invention.
Figure 11:
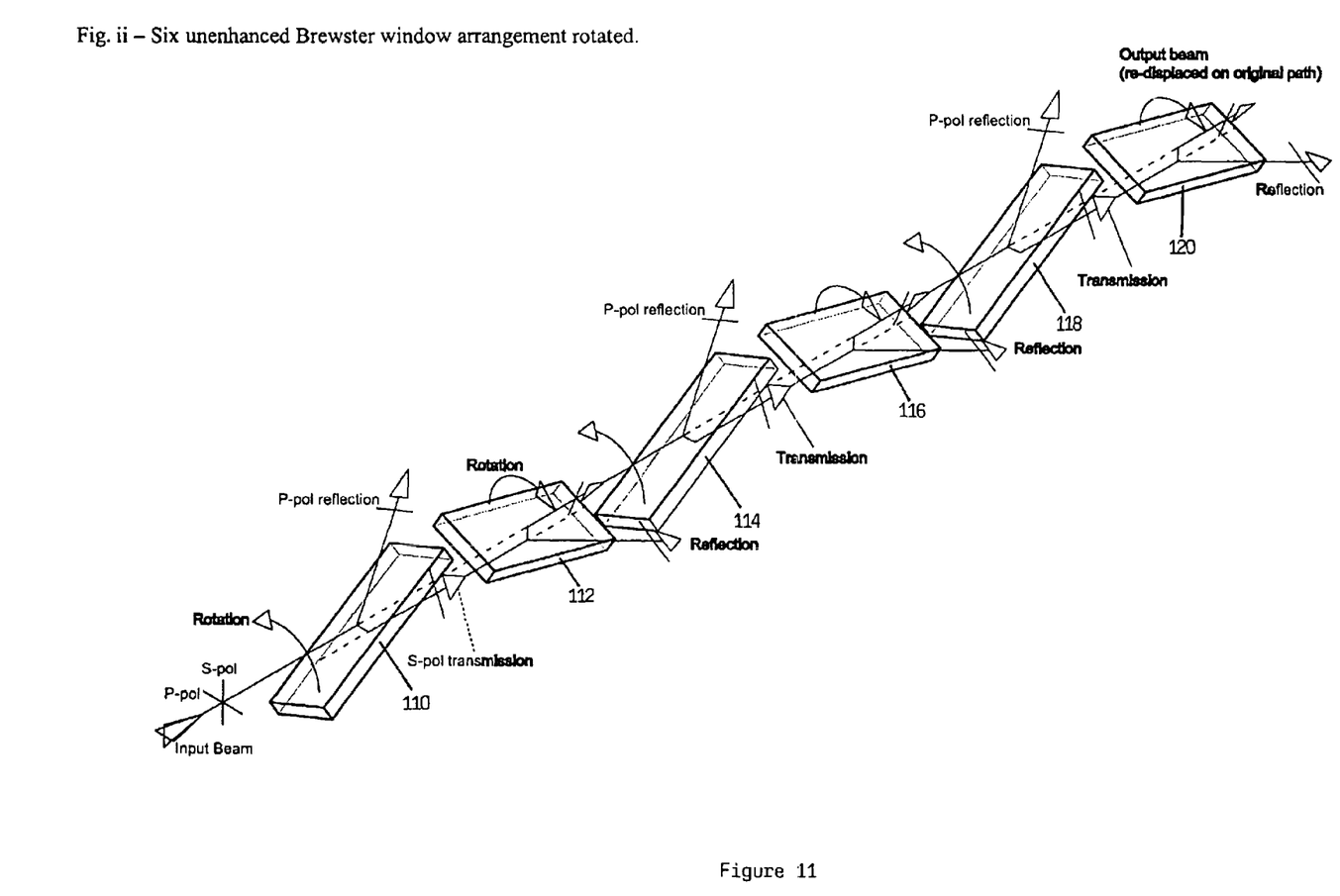
FIG. 11 shows the arrangement of FIG. 10 where in the Brewster windows have been rotated according to the present invention.

FIGS. 10 and 11 show an arrangement of six Brewster windows according to a second embodiment of the invention. While in one preferred embodiment of the invention a plurality of pairs of Brewster windows is used, the invention is not limited to any specific number of pairs but could be implemented by using two pairs, three pairs, etc.

FIG. 10 shows three pairs of Brewster windows 110 and 112, 114 and 116, 118 and 120, wherein each pair of Brewster windows is aligned along an axis of the laser beam and the Brewster windows within each pair are aligned relative to each other for the output beam energy path to be the same as the input beam energy path by the actions of the respective second Brewster windows compensating for the vertical displacement created by the first Brewster windows. If using two sets or pairs (4 Brewster windows) the first set is arranged to rotate eg. +45°/−45° and the second set −45°/+45° the beam can be redisplaced in both the vertical and horizontal directions. This is illustrated in FIG. 10. Also in FIG. 10, the Brewster windows 110 to 120 are aligned at 0° to provide a 100% transmission for a selected laser beam having a selected polarization, such as is possible using a $CO_2$ laser beam. In principle, the behaviour of the laser beam transmitted through the six Brewster windows 106 to 110 corresponds to that explained with reference to FIG. 4. Therefore, this description will not be repeated here.

In the embodiment of FIG. 10 it is assumed that uncoated or unenhanced Brewster windows are used which have the advantage of transmitting high laser beam energy levels, up to 6 kW and above whereas a coated Brewster window usually would be damaged when exposed to laser beam energy levels substantially above 1 kW. The uncoated or unenhanced Brewster windows do have the apparent drawback that they do not achieve a transmission curve from 100% to 0% when rotated through 90° but "only" from 100% to e.g. about 25%, depending on the type of laser energy and the material used for the Brewster window. This apparent disadvantage is compensated by the present invention through the use of multiple pairs of Brewster windows as explained below.

FIG. 11 shows the arrangement of three pairs of Brewster windows 110 and 112, 114 and 116, 118 and 120 of FIG. 10 wherein the two Brewster windows of each pair are rotated in opposite directions from 0° through an angle of between 45° and 90° to control the overall transmission of the laser beam from maximum to minimum. The behaviour of the laser beam transmitted through each pair of Brewster windows, with regard to the rotation of polarization and reduction of transmission in general is the same as explained with reference to FIG. 6. Therefore, this description is not repeated here. However, there is a difference between uncoated and coated Brewster windows in that the transmission curve of the uncoated Brewster window differs from that of the coated Brewster window.

This is best explained with reference to FIG. 12.

Figure 12:
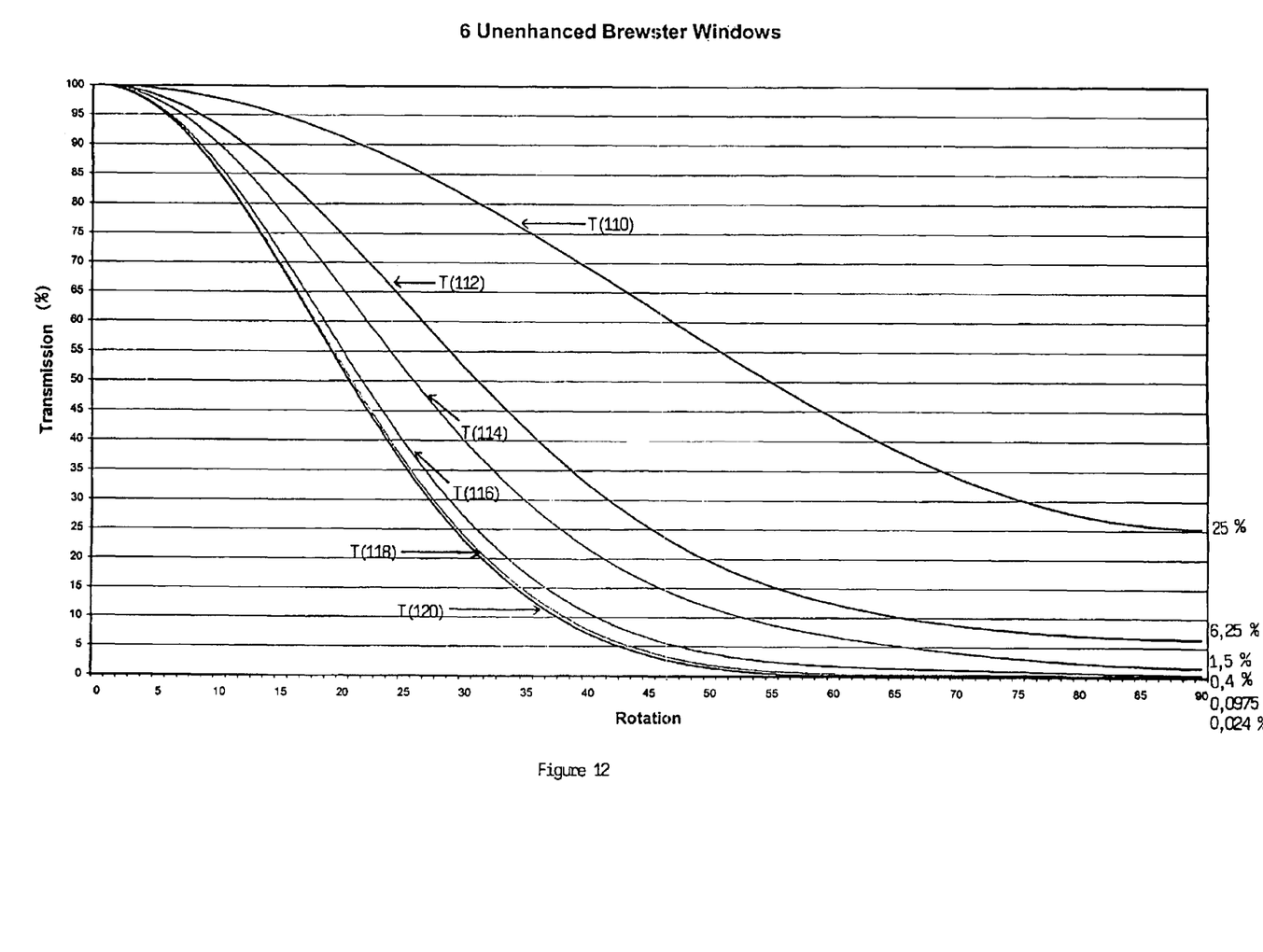
FIG. 12 shows a diagram of the transmission curves of a laser beam when using three pairs of Brewster windows, as shown in FIGS. 10 and 11.

FIG. 12 shows the transmission curves of the six Brewster windows 110 to 120 of FIG. 11 when they are rotated, within each pair in opposite directions, through 90°. The transmission curve of the first Brewster window 110 is designated T(110). The combined transmission curve of the first and second Brewster windows 110, 112 is designated T(112), etc. Finally, the transmission curve of the output beam exiting the last Brewster window 120 is designated T(120). As may be gathered from FIG. 12, the transmission curve of the first Brewster window 110 goes from 100% to about 25% when the Brewster window 110 is rotated through 90°. The output beam of the first Brewster window 110 is transmitted by the second Brewster window 112, again effecting a reduction from 100% to 25%, resulting in an output beam of the second Brewster window 112 which goes from 100% to 6,25% of the input beam energy. After the laser beam has travelled through all six Brewster windows 110 to 120, which have been rotated correctly, only about 0,024% of the input laser beam will exit the sixth and last Brewster window 120.

While the first embodiment of the invention, preferably is used for polymer cutting and marking, the second embodiment of the invention is particularly suitable for high power laser beam applications such as cutting and marking of metals. In such applications, small laser beam energy levels are harmless and may be neglected. Therefore, from examining the curves of FIG. 12, an expert would easily recognise that when using three pairs of Brewster windows it would be sufficient to rotate each pair, in opposite direction, through an angle between 50° and 55°. When e.g. only two pairs of Brewster windows are used, for many application it would be sufficient to rotate each pair of Brewster windows, in opposite direction, through an angle between about 55° and 65°.

It should be understood that in the transmission curves shown in the drawings, the angle ranges for rotating the Brewster windows and the number of pairs of Brewster windows used are disclosed merely for illustration purpose and in no way limit the present invention. Depending on the specific application, the type and power of the laser beam as well as the Brewster window and its coating, any other suitable values can be chosen for these parameters.

The present invention has several advantages.

For every corresponding rotational action plus and minus (or vice versa) by the first Brewster window and the second Brewster window respectively the vertical displacement of the beam energy transmitted through the first Brewster window is re-displaced by the second Brewster window thereby always keeping the exiting output beam energy on the same vertical path as the incoming input beam energy.

Advantageously by only rotating the Brewster windows through an angle between 0° and 45° there are benefits in the higher speeds at which this method can operate.

Advantageously by rotating the Brewster windows by 45° instead of 90° there are benefits in the motorisation of the system where for example galvanometric motors perform much better.

Advantageously by using more than one pair of Brewster windows the maximum rotating angles can be further reduced, higher speeds can be achieved and vertical and horizontal displacements of the transmitted laser beam can be compensated.

Advantageously, referring to the example as depicted in FIG. 6, by rotating the Brewster windows through plus and minus 45° (or vice versa) a maximum of half the S-pol transmission is reflected off the first Brewster window leaving the remainder which has been rotated by the first Brewster window to be reflected off the second Brewster window. Not accounting for the specific parameters and performance of any coating on the two Brewster windows when they are combined in this way this method allows for double the laser beam energy to be controlled as each of the two Brewster windows share the reflected power equally into two energy dumps.

In the first embodiment, when the first and second Brewster windows are rotated through +/−45°, the first Brewster window transmits between 100% and 50% of the laser beam and reflects the remainder, wherein the second Brewster window transmits between 0% and 100% of the 0% to 50% of the laser beam transmitted by the first Brewster window. Accordingly, in their end position of +/−45° rotation, the first Brewster window reflects 50% of the original laser beam and the second Brewster window reflects the remaining 50% of the original laser beam, dividing the laser energy which has to be diverted into a beam dump by half. This substantially facilitates handling of the laser beam energy which is reflected by the Brewster windows.

When using uncoated Brewster windows, as in the second embodiment of the present invention, the invention has the additional advantage that it allows handling and controlling high power laser beams, up to 6 kW.

The present invention also provides the same method and apparatus with a coating on the Brewster windows which may be able to withstand laser energy levels of between one and six kilowatts and which may be somewhere between an unenhanced and a fully enhanced coating.

What is claimed is:

1. A method of controlling a level of laser beam energy of a laser beam, using at least two Brewster windows rotated by a driving means, said Brewster windows being which are aligned along an axis which is parallel to the direction of the laser beam, wherein said Brewster windows are rotated around said axis using the driving means, and wherein a first Brewster window is rotated in one direction and a second Brewster window is rotated in the opposite direction synchronously around the axis parallel to the direction of the laser beam.

2. The method of claim 1, wherein the first and second Brewster windows are rotated in synchronism, each through +45° and −45°, respectively, to control transmission of the laser beam from maximum to minimum and vice-versa.

3. The method of claim 1, wherein the first and second Brewster windows are rotated in synchronism, each through an angle of +m degree and −m degree, respectively, wherein $45 \leq m \leq 90$, to control transmission of the laser beam from maximum to minimum and vice-versa.

4. The method of claim 1, wherein the rotation axes of a number of pairs of Brewster windows are aligned along said axis, each pair comprising a first Brewster window and a second Brewster window.

5. The method of claim 4 wherein two or three pairs of Brewster windows are provided.

6. The method of claim 1, wherein the laser beam is a linearly polarised laser beam.

7. An apparatus for controlling a level of laser beam energy of a laser beam, comprising at least two Brewster windows which are aligned along an axis which is parallel to the direction of the laser beam, and driving means for rotating said Brewster windows around said axis, wherein said driving means are adapted to rotate a first Brewster window in a first direction and a second Brewster window in a second, opposite direction synchronously around the axis parallel to the direction of the laser beam.

8. The apparatus of claim 7, comprising a pair of coated Brewster windows including said first and second Brewster windows.

9. The apparatus of claim 7, comprising a plurality of pairs of uncoated Brewster windows, each pair including first and second Brewster windows aligned along said axis.

10. The apparatus of claim 9, comprising two or three pairs of Brewster windows.

11. The apparatus of claim 7, comprising a laser source for generating a linearly polarised laser beam.

12. The apparatus of claim 7, wherein the laser source comprises a $CO_2$ laser having an output power of between 0.1 and 6 kW.

* * * * *